US010339779B2

(12) United States Patent
Möller et al.

(10) Patent No.: US 10,339,779 B2
(45) Date of Patent: Jul. 2, 2019

(54) MONITORING SYSTEM

(71) Applicant: MSA Europe GmbH, Jona (CH)

(72) Inventors: Julian Möller, Berlin (DE); Torsten Hofmann, Rangsdorf (DE)

(73) Assignee: MSA Europe GmbH, Jona (CH)

( * ) Notice: Subject to any disclaimer, the term of this patent is extended or adjusted under 35 U.S.C. 154(b) by 71 days.

(21) Appl. No.: 15/303,144

(22) PCT Filed: Apr. 13, 2015

(86) PCT No.: PCT/EP2015/057926
§ 371 (c)(1),
(2) Date: Oct. 10, 2016

(87) PCT Pub. No.: WO2015/155364
PCT Pub. Date: Oct. 15, 2015

(65) Prior Publication Data

US 2017/0039834 A1 Feb. 9, 2017

(30) Foreign Application Priority Data

Apr. 11, 2014 (DE) ........................ 10 2014 207 027

(51) Int. Cl.
*H04W 60/00* (2009.01)
*G08B 21/02* (2006.01)
*G08B 25/00* (2006.01)

(52) U.S. Cl.
CPC ..... *G08B 21/0275* (2013.01); *G08B 21/0227* (2013.01); *G08B 21/0238* (2013.01); *G08B 25/003* (2013.01)

(58) Field of Classification Search
None
See application file for complete search history.

(56) References Cited

U.S. PATENT DOCUMENTS 6,472,988 B1 10/2002 Feld et al.
8,400,276 B2 3/2013 Tanaka
(Continued)

FOREIGN PATENT DOCUMENTS

DE 19822412 B4 6/2008
EP 0995703 A1 4/2000
(Continued)

*Primary Examiner* — Brent Swarthout
(74) *Attorney, Agent, or Firm* — The Webb Law Firm

(57) ABSTRACT

A monitoring system (1) for monitoring a deployed person. It includes a base station (11) which provides a radio cell (F) in accordance with a first wireless communication standard; and at least one mobile monitoring apparatus (12) which is designed for wireless communication with the base station (11) via the radio cell (F) in accordance with the first wireless communication standard. The mobile monitoring apparatus (12) includes a signaling tag (121) and the base station (11) includes a wireless interface (111) which is designed to automatically read out from the mobile monitoring apparatus (12) participant information (3) required for a registration in the radio cell (F), via the signaling tag (121), wirelessly in accordance with a second wireless communication standard, when the mobile monitoring apparatus (12) is within a minimum distance (A) from the base station (11), which is predetermined by the second wireless communication standard.

19 Claims, 2 Drawing Sheets

(56) References Cited

U.S. PATENT DOCUMENTS

| | | | | |
|---|---|---|---|---|
| 2008/0120369 | A1* | 5/2008 | Gustavsson | H04L 67/1095 709/204 |
| 2009/0157799 | A1* | 6/2009 | Sukumaran | G06Q 10/10 709/203 |
| 2013/0023206 | A1 | 1/2013 | Burr | |
| 2013/0237148 | A1* | 9/2013 | McCann | H04W 4/02 455/41.1 |
| 2014/0068717 | A1 | 3/2014 | Mayes et al. | |
| 2015/0095980 | A1* | 4/2015 | Balakumar | H04L 63/08 726/3 |

FOREIGN PATENT DOCUMENTS

| | | | |
|---|---|---|---|
| EP | 1995703 | A1 | 11/2008 |
| EP | 2704118 | A1 | 3/2014 |
| FR | 2842375 | A1 | 1/2004 |

* cited by examiner

MONITORING SYSTEM

CROSS REFERENCE TO RELATED APPLICATIONS

This application is the United States national phase of International Application No. PCT/EP2015/057926 filed Apr. 13, 2015, and claims priority to German Patent Application No. 10 2014 207 027.9 filed Apr. 11, 2014, the disclosures of which are hereby incorporated in their entirety by reference.

BACKGROUND OF THE INVENTION

Field of the Invention

The subject matter described herein relates to a monitoring system for monitoring a deployed person.

Description of Related Art

A monitoring system is disclosed, for example, in the alpha personal network user instructions of the company MSA, The Safety Company. The monitoring system described therein is used to monitor an equipment object in the form of a breathing protection device of a deployed person. The breathing protection device is worn by the deployed person during a deployment and it supplies breathing air to the deployed person during the deployment.

The monitoring system described therein comprises a base station which provides a radio cell in accordance with a proprietary wireless communication standard. In this radio cell, which forms a wireless network, a mobile monitoring apparatus acts as a participant, wherein more than two monitoring apparatuses can be participants of the wireless network.

The mobile monitoring apparatus is also part of the monitoring system and, like the equipment object, it is also worn on the body of the deployed person. The mobile monitoring apparatus is connected to the equipment object and is designed to receive information on the status of the equipment object, for example, on the correct operating mode. Depending on this information, the mobile monitoring apparatus transmits status data indicative of the status of the equipment object to the base station. In this manner, the deployed person wearing the equipment object can be monitored.

The mobile monitoring apparatus is designed for a wireless communication with a base station via the radio cell in accordance with a proprietary wireless communication standard. In this manner, a deployment leader can monitor the deployment by way of a computer which can be connected to the base station and, for example, determine, on the basis of the status data, which actions are to be taken, for example, whether a withdrawal of the deployed person is necessary, for example, because the status data indicate that the equipment object needs attention. The base station or the computer connected to the base station can also transmit in a predetermined manner, depending on the status data, command data to the mobile monitoring apparatus via the radio cell, so that the deployed person can see which action should be taken, on the basis of the received command data.

SUMMARY OF THE INVENTION

In summary, one embodiment provides a monitoring system (1) for monitoring a deployed person, comprising a base station (11) which is designed for providing a radio cell (F) in accordance with a first wireless communication standard; and a mobile monitoring apparatus (12) which is designed for wireless communication with the base station (11) via the radio cell (F) in accordance with the first wireless communication standard, so that status data (2) being indicative of a status of the deployed person and/or of a status of an equipment object of the deployed person and/or of a current environmental situation of the deployed person can be transmitted from the mobile monitoring apparatus (12) to the base station (11); characterized in that the mobile monitoring apparatus (12) comprises a signaling tag (121) and the base station (11) comprises a wireless interface (111) which is designed to automatically read out from the mobile monitoring apparatus (12) participant information (3) required for an registration in the radio cell (F), wirelessly via the signaling tag (121) in accordance with a second wireless communication standard, if the mobile monitoring apparatus (12) has come within a minimum distance (A) from the base station (11), which is predetermined by the second wireless communication standard.

Another embodiment provides a mobile monitoring system, comprising: a base station which provides a radio cell, wherein the radio cell uses a first communication standard; and at least one mobile monitoring apparatus communicating with the base station to register as a participant in the radio cell using a second communication standard.

A further embodiment provides a mobile monitoring apparatus, comprising: a first communication element that communicates with a base station to register as a participant in a radio cell using a short range communication standard; and a second communication element that communicates monitoring data with the base station using another communication standard.

A further embodiment provides a base station, comprising: a first communication element that communicates with at least one mobile monitoring apparatus using a short range communication standard to register the at least one mobile monitoring apparatus as a participant in a radio cell; and a second communication element that communicates monitoring data with the at least one mobile monitoring apparatus using another communication standard.

A further embodiment provides a method, comprising: registering at least one mobile monitoring apparatus for participation in a radio cell with a base station using a first communication channel; the first communication channel being a short range wireless communication channel; thereafter employing a second communication channel to communicate monitoring data between the at least one mobile monitoring apparatus and the base station; the second communication channel being a longer range wireless communication channel.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION OF THE INVENTION

Figure 1:
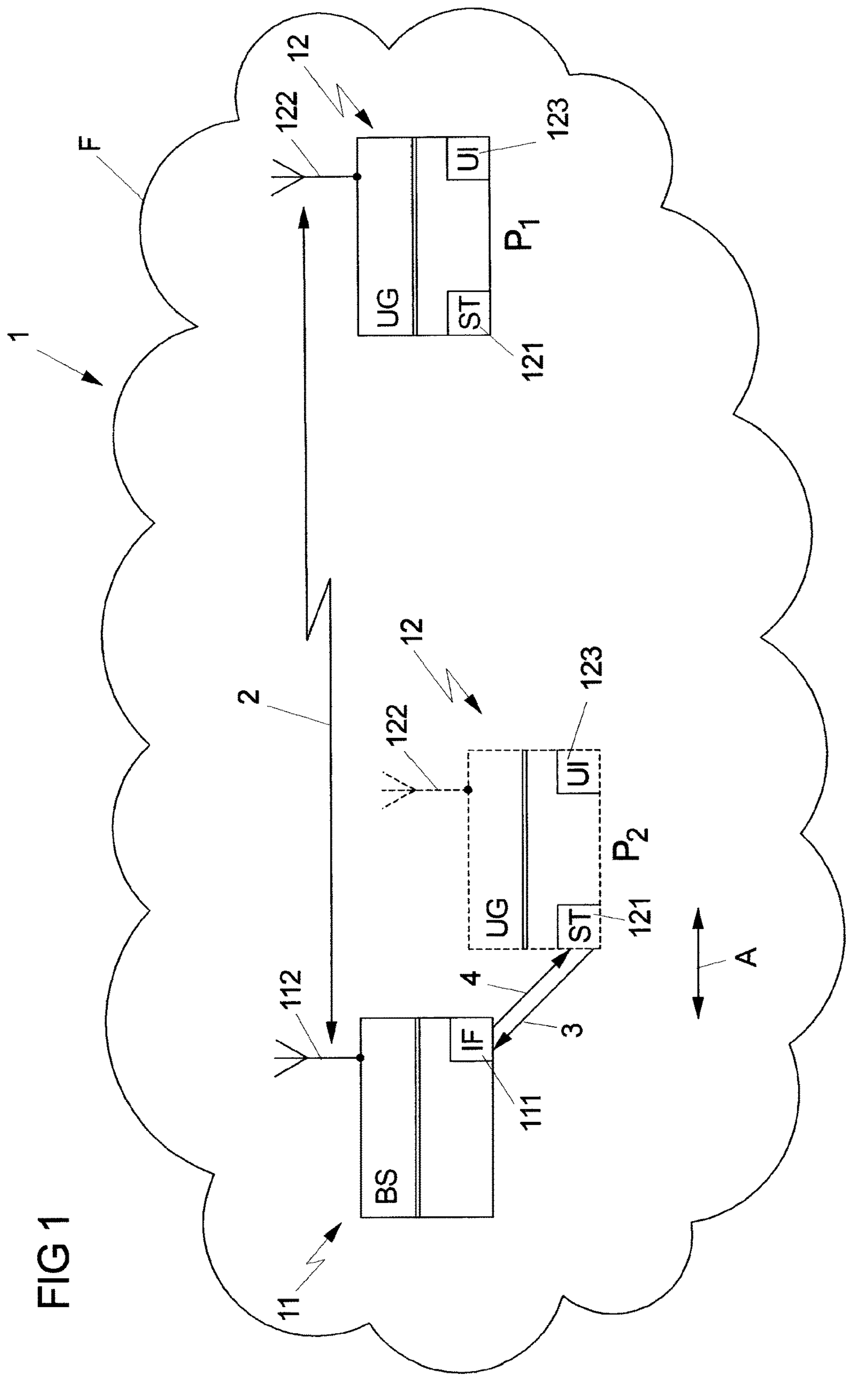
FIG. 1 is a diagrammatic representation example of an embodiment of a monitoring system according to the principles of the present invention.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of the described embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

For the mobile monitoring apparatus to act as a participant in the radio cell, it is necessary for the mobile monitoring apparatus to be first registered, that is registered, as a participant at the base station. Usually, this matriculation/registration also occurs wirelessly in accordance with a proprietary wireless communication standard. However, this has the disadvantage that incorrect registrations occur when several monitoring apparatuses are located in the region of the radio cell and attempt simultaneously to be registered by the base station in the radio cell as a participant; that is to say when several registration attempts are undertaken simultaneously.

It would be desirable to have a monitoring system which allows a reliable registration of a mobile monitoring apparatus by the base station, such as the monitoring system according to at least independent Claim 1. Features of other advantageous variants are indicated in the other claims.

The terms "registration" and "matriculation" are used as synonyms; both refer to the same process of base station-side registration of the mobile monitoring apparatus as a participant in the radio cell, which occasionally is also referred to as "pairing" of a base station and a mobile monitoring apparatus. The same applies as appropriate to the terms "exmatriculation" and "deregistration."

According to an embodiment, the registration of the mobile monitoring apparatus by the base station does not occur according to a first wireless communication standard, according to which the radio cell is operated and according to which the status data is transmitted by the mobile monitoring apparatus to the base station, but in accordance with a second wireless communication standard, which differs from the first wireless communication standard, and only when the mobile monitoring apparatus goes below a minimum distance from the base station, which is predetermined by the second wireless communication standard. If this is the case, then a wireless interface of the base station automatically reads out from the mobile monitoring apparatus participant information via a signaling tag of the mobile monitoring apparatus and uses this participant information for a registration/matriculation of the mobile monitoring apparatus in the radio cell. This minimum distance is advantageously less than 50 cm. On the other hand, the range of the radio cell is a multiple of the minimum distance, for example, one meter, 5 m or 30 to 300 m, for example. Due to the small minimum distance, it is possible to prevent several mobile monitoring apparatuses from simultaneously seeking to be registered/matriculated by the base station at the same time. Therefore, errors during the registration of the mobile monitoring apparatus can largely be avoided.

Below, features of the monitoring system according to the present invention are explained in greater detail.

The monitoring system according to an embodiment serves for monitoring a deployed person, for example, for monitoring a status of the deployed person and/or a status of an equipment object of the deployed person and/or a current environmental situation of the deployed person.

The deployed person is, for example, a fireman, a policeman, a mine worker or the like. Similar deployed persons usually carry many equipment objects with themselves, such as, for example, a breathing protection device, a gas detector, a motion sensor, a sensor for monitoring physical statuses of the deployed person (lung functionality, heart functionality, etc.). For the safety of the deployed person, it is advantageous to monitor such equipment objects to determine their performance in order to notify the deployed person in the event of a malfunction and/or imminent malfunction of the equipment object in question and/or about another hazardous situation.

The formulation "monitoring a deployed person" can also mean monitoring a gas composition—determined by way of the equipment object—of a gas surrounding the deployed person, or a determined physical parameter of the deployed person or the like.

For monitoring purposes, the mobile monitoring apparatus can be connected wirelessly or by wire to the equipment object. Here, the formulation "connection to the equipment object" is not intended to suggest that the equipment object and the monitoring apparatus have to be entities that are spatially separate from one another; rather, the mobile monitoring apparatus can also be integrated in the equipment object, that is be a part thereof.

The monitoring apparatus monitors, for example, on the basis of data that the equipment object provides, the operation of the equipment object in question and informs the deployed person, for example, in an optical and/or acoustic manner about the operating status and/or about a malfunction, a failure and/or about an imminent malfunction and/or about another hazardous situation. The mobile monitoring apparatus is usually worn—like the equipment object as well—on the body of the deployed person and it is designed accordingly.

The monitoring of the deployed person does not occur only locally via the monitoring apparatus; rather, a central monitoring of all the deployed persons occurs. For these purposes, the monitoring system according to one embodiment comprises a base station, which is designed for providing a radio cell according to a first wireless communication standard. The first wireless communication standard is, for example, a proprietary standard, an IEEE 802.15.4 (ZigBee) standard, or a wireless local area network standard, for example, a standard of the IEEE-802.11 family. The radio cell operated from the base station in accordance with the first wireless communication standard has a comparatively large range of, for example, at least 5 meters, for example, in the "free field," that is in an area that the radio cell does not interfere or interferes only a little in terms of its propagation. The radio cell of the base station extends, for example, to a circular region having a radius of at least 5 meters (whose center is the station). For providing and operating the radio cell, the base station has, for example, at least one antenna, by which the data can be transmitted to mobile monitoring apparatuses and received by the mobile monitoring apparatuses.

The radio cell provided by the base station forms a wireless network according to the first wireless communication standard in which, in particular, more than two monitoring apparatuses can operate as participants. Several monitoring apparatuses can thus communicate simultaneously with the base station in accordance with the first wireless communication standard. It is also possible to provide more than one base station. Alternatively or additionally, repeaters can also be installed to increase the range of the radio cell.

For example, a computer is connected to the base station in which monitoring software can be run, which is designed for evaluating received data sent by the mobile monitoring apparatuses and for providing data to be sent out, which is to be received by the mobile monitoring apparatuses. It is also possible to store on the computer the information on how many and, optionally, which mobile monitoring apparatuses are authorized to operate as participants in the radio cell.

Furthermore, part of the monitoring system according to an embodiment consists of a mobile monitoring apparatus (hereafter referred to simply as a "monitoring apparatus"), which is designed for wireless communication with the base station via the radio cell in accordance with the first wireless communication standard and optionally for connection to the equipment object. In this manner, status data indicative of a status of the deployed person and/or for a status of an equipment object of the deployed person and/or for a current environmental situation of the deployed person can be transmitted by the mobile monitoring apparatus to the base station. The mobile monitoring apparatus receives operating data, for example, from the equipment object and sends it, optionally after preliminary processing, as status data via the radio cell to the base station.

The base station can forward the received status data, for example, to a computer connected to the base station, so that the status data can be evaluated centrally there. Depending on the status data, the base station can also send data to the mobile monitoring apparatus, which, upon the reception of such data, can inform the deployed person optically and/or acoustically about a current operating state of the equipment objects and/or about an action to be carried out.

The status data indicate, for example, the filling level of a breathing air bottle, the current gas composition of the gas surrounding the deployed person and/or a physical status of the deployed person. However, an embodiment is not limited to any specific status data.

In one embodiment, the mobile monitoring apparatus comprises a signaling tag and the base station comprises a wireless interface for the interaction with the signaling tag. Both the signaling tag and also the wireless interface are designed to operate according to a second wireless communication standard which is different from the first one.

The second wireless communication standard is, for example, a near field communication standard, for example, the near field communication (NFC) standard and/or the radio frequency identification (RFID) standard.

The wireless interface of the base station is designed in order to automatically read out wirelessly from the mobile monitoring apparatus participant information that is required for a registration in the radio cell, via the signaling tag of the mobile monitoring apparatus in accordance with the second wireless communication standard, if the mobile monitoring apparatus goes below a minimum distance from the base station, which is predetermined by the second wireless communication standard. Thus, if the mobile monitoring apparatus is moved into the vicinity of the base station, then the base station automatically reads out by means of the wireless interface the participant information from the mobile monitoring apparatus. The participant information can be stored, for example, in the signaling tag itself. For these purposes, the signaling tag comprises, for example, a memory. An additional condition for the automatic readout of the participant information can be that the signaling tag has been activated beforehand, for example, manually by the deployed person, which is described in greater detail in a later passage.

The signaling tag can be in particular a passive signaling tag which causes nearly no energy consumption in the mobile monitoring apparatus and which is designed to be activated by a high frequency field provided by the wireless interface, and to bring about the sending or reading out of the participant information.

According to an embodiment, the automatic readout of the participant information is possible only if the mobile monitoring apparatus has come within the minimum distance from the base station. This minimum distance is predetermined by the second wireless communication standard and may be, for example, less than 50 cm. In this manner, it is possible to ensure in a simple manner that at all times only a single mobile monitoring apparatus is being registered with a base station, and thus that errors that may occur due to simultaneous registration processes are prevented.

In particular, the wireless interface and the signaling tag are designed so that, between the base station and the mobile monitoring apparatus, a point-to-point connection is set up in accordance with the second wireless communication standard, wherein the point-to-point connection allows communication exclusively between the base station and the mobile monitoring apparatus. In this manner, occurrences of simultaneous registration attempts and thus possibly associated errors are ruled out.

The signaling tag is an interface unit which may be of any type and which is designed so as to make the participant information stored in the mobile monitoring apparatus available to the base station. For example, the signaling tag is designed as a part of a processor of the mobile monitoring apparatus, which operates the mobile monitoring apparatus. In another embodiment the signaling tag is configured as a separate signaling label. For example, the signaling tag is an RFID module or an NFC module, for example, an RFID chip or an NFC chip.

The base station receives this participant information via the wireless interface. The term "readout" can consequently also refer exclusively to reception by the base station of the participant information sent by the mobile monitoring apparatus. The participant information from the base station reaches the base station from the mobile monitoring apparatus only if the mobile monitoring apparatus has dropped below the predetermined minimum distance from the base station, and that the participant information is transmitted not in accordance with the first wireless communication standard, but rather in accordance with the second wireless communication standard.

Below, additional embodiments of the monitoring system according to the invention are described. The characteristics of these additional embodiments can be combined with one another and also with the optional features already described above in order to form additional embodiments, provided they are not explicitly described as alternatives to one another.

In an embodiment, the base station is designed to register the mobile monitoring apparatus as a participant in the radio cell based on the participant information read out, or, if the mobile monitoring apparatus is already registered as a participant in the radio cell, to exmatriculate (that is to say deregister) the mobile monitoring apparatus.

The registration of the mobile monitoring apparatus as a participant in the radio cell provided by the base station occurs automatically as soon as the mobile monitoring apparatus is within the preset minimum distance from the base station (and if applicable the signaling tag has been activated beforehand). Here, the participant information is transmitted by the mobile monitoring apparatus to the base station in accordance with the second wireless communication standard. On the basis of this participant information, the registration of the mobile monitoring apparatus in the radio cell occurs so that the mobile monitoring apparatus subsequently can communicate as a participant in the radio cell with the base station in accordance with the first wireless communication standard.

The first wireless communication standard is, for example, a proprietary standard, an IEEE 802.15.4 (ZigBee) standard, or a wireless local area network standard, for example, a standard of the IEEE-802.11 family. The second wireless communication standard is, for example, a near field communication standard, for example, the NFC standard and/or the RFID standard. The minimum distance is predetermined by the second wireless communication standard and it is, for example, less than 50 cm, for example, 5 cm. The range of the radio cell here is a multiple of the minimum distance, for example, more than 30 meters.

In an additional embodiment, the signaling tag of the mobile monitoring apparatus is configured and designed as a passive signaling tag so as to be activated only by a high frequency field provided by the wireless interface of the base station. For example, in this variant, the signaling tag comprises an RFID tag which is activated by the high frequency field provided by the wireless interface and which, after activation, provides the participant information so that it can be transmitted by the mobile monitoring apparatus to the base station, and thus the base station can read out the participant information from the signaling tag. This variant has the signaling tag configured as a passive signaling tag that causes no energy consumption in the mobile monitoring apparatus, and thus the operational duration of the mobile monitoring apparatus, which is usually battery-powered, is not lowered.

In another variant, the wireless interface of the base station is designed to be passive and the signaling tag of the mobile monitoring apparatus is designed to be active, wherein the active signaling tag, when below the minimum distance, causes the wireless interface to read out the participant information from the signaling tag. In the process, the signaling tag transmits the participant information to the wireless interface.

In an additional embodiment of the monitoring system, the mobile monitoring apparatus is designed to automatically receive from the base station by way of the signaling tag base station information, which is provided by the wireless interface of the base station, wirelessly in accordance with the second wireless communication standard, when the mobile monitoring apparatus has come within the minimum distance from the base station. Furthermore, the mobile monitoring apparatus is designed so as to enroll itself in the radio cell as a participant on the basis of the received base station information.

According to this variant, not only participant information is transmitted by the mobile monitoring apparatus to the base station, but the base station information is also transmitted by the base station to the mobile monitoring apparatus. In this manner, the enrollment procedure can be accelerated. Depending on the design of the radio cell or depending on the first wireless communication standard used, it can be necessary that the mobile monitoring apparatus, in addition to the matriculation (registration) by the base station, also signs on in the radio cell as a participant in order to be able to communicate with the base station in accordance with the first wireless communication standard, that is to say, for example, in order to transmit the status data in accordance with the first wireless communication standard to the base station. Thus, during pairing, data can also be transmitted from the base station to the mobile monitoring apparatus, such as, for example, information about a sign-on channel, an operating frequency, an identification of the base station, a cryptographic key, etc.

For example, the base station first reads out the participant information when the mobile apparatus has come within said minimum distance. As a reaction to the reception of the participant information, the base station transmits the base station information to the mobile monitoring apparatus. However, it is also possible that, once below the minimum distance, the mobile monitoring apparatus first receives the base station information, and, as a reaction to the reception, provides the participant information to the base station.

Once below the minimum distance, it is possible accordingly for an automated communication between the base station and the mobile monitoring apparatus to be initiated automatically, during which communication there is in particular an exchange of data required for the mobile monitoring apparatus to be able to operate as a participant in the radio cell made available by the base station, in particular to be able to transmit the status data to the base station in accordance with the first wireless communication standard. The automatic communication, which is automatically initiated once below the minimum distance, can occur, for example, in accordance with a handshake protocol.

The readout of the participant information and the reception of the base station information can be used not only in order to matriculate (register) the mobile monitoring apparatus as a participant in the radio cell, but also in order to exmatriculate (deregister) the mobile monitoring apparatus as a participant, for example, when the deployed person has terminated the deployment and has to or would like to communicate this termination of deployment. In addition, the mobile monitoring apparatus is configured, for example, in order to carry out, depending on the received base station information, configuration settings, for example, to preset pressure alarm thresholds, display settings relating to pressure and/or remaining deployment durations, and/or a parameter for calculating such durations.

The participant information comprises, for example, a matriculation request (a registration request), an exmatriculation request (a deregistration request), a monitoring apparatus serial number, a name of the deployed person, a matriculation number of the deployed person, frequency band information, channel information, and/or data relating to the equipment object. Based on the participant information, the base station can matriculate (register) or exmatriculate (deregister) the mobile monitoring apparatus as a participant in the radio cell. In addition, the participant information can also comprise additional information which is suitable for the central monitoring of the equipment apparatus or of the deployed person who is carrying the equipment object.

The base station information comprises, for example, a registration confirmation, a deregistration confirmation and/or an error notification. The monitoring apparatus can comprise a control unit which is designed in order to control the mobile monitoring apparatus depending on the received base station information. For example, upon reception of a registration confirmation, a registration as a participant in the radio cell thus occurs. Upon reception of a deregistration confirmation the transition to an energy saving mode can be initiated, for example. Upon reception of an error message an error processing procedure can be started, for example.

In an additional embodiment of the monitoring system, the mobile monitoring apparatus comprises a transceiver designed for transmitting the status data and is designed to activate or deactivate the transceiver depending on the base station information received by means of the signaling tag. This activation or deactivation of the transceiver as well can occur by way of the control unit optionally provided in the mobile monitoring apparatus. In this manner, the monitoring apparatus achieves energy savings since the transceiver is activated only when the mobile monitoring apparatus is actually operating as a participant in the radio cell and the transceiver is deactivated immediately after the deregistration of the monitoring apparatus at the base station.

In an additional embodiment, the mobile monitoring apparatus is designed to switch the signaling tag to an energy saving mode and to activate it only when the mobile monitoring apparatus goes below the minimum distance from the base station and/or when a certain input command is being entered or has been entered via an operating element of the mobile monitoring apparatus, for example, by the deployed person. For example, the signaling tag is thus designed as an active signaling tag, which is, however, activated only when below the minimum distance and/or when a certain input command is being entered or has been entered via an operating element of the mobile monitoring apparatus. For example, the mobile monitoring apparatus transmits the participant information to the base station upon reception of the specific input command, and only if below the minimum distance or an activation of the signaling tag has been brought about by the deployed person by means of the input command.

The various embodiments will be explained in further detail below in reference to the embodiment examples represented in the figures.

FIG. 1 shows a diagrammatic representation example of an embodiment of a monitoring system 1. The monitoring system 1 is used for monitoring a deployed person that is not represented in FIG. 1. For these purposes, the monitoring system 1 comprises a base station (BS) 11 and at least one mobile monitoring apparatus (UG) 12. The monitoring apparatus 12 can be carried by the deployed person and it can be connected, for example, operatively to an equipment object of the deployed person, for example, to a breathing air apparatus.

By an antenna 112 provided for that purpose, the base station 11 makes available a radio cell in accordance with a first wireless communication standard, for example, in accordance with a proprietary standard, in accordance with the IEEE 802.15.4 (ZigBee) or a WLAN standard. The radio cell (F) has a larger range, for example, more than 30 meters. The radio cell (F) forms a wireless network in which the mobile monitoring apparatus 12 and additional mobile monitoring apparatuses, that is to say in any case more than two mobile monitoring apparatuses, can act as participants (clients).

Usually, in addition to the mobile monitoring apparatus 12, further mobile monitoring apparatuses, not shown in FIG. 1, are also provided for monitoring additional deployed persons. However, to illustrate the design and the operating mode of the monitoring system 1 only a single mobile monitoring apparatus 12 is represented in FIG. 1, in particular in two mutually differing positions $P_1$ and $P_2$. In the first position $P_1$, the mobile monitoring apparatus 12 is within the range of the radio cell (F), but at a greater distance from the base station 11 than a minimum distance (A). In the second position $P_2$, the mobile monitoring apparatus 12 is also within the range of the radio cell (F), but here it is below the minimum distance (A).

The monitoring apparatus 12 is configured in order to act as a participant (client) in the radio cell (F) provided by the base station 11 or in the wireless network. For example, the monitoring apparatus 12 transmits, by a transceiver 122 provided for that purpose, status data 2 via the radio cell (F) to the base station 11. Before this transmission, the monitoring apparatus 12 transmits the status data, for example, depending on data that are provided by the equipment object. The equipment objects can be, for example, a breathing air device, a gas detector, a motion sensor and/or a biometric sensor, etc. The monitoring apparatus 12 can be connected wirelessly or by wire to this equipment object, for example, as part of the respective equipment object. Like the equipment object, the mobile monitoring apparatus 12 is also designed so it can be worn on the body of the deployed person.

The deployed person is to be monitored centrally, for example, by a computer—not represented in FIG. 1—which is connected to the base station 11. For this purpose, for example, the base station 11 forwards the received status data to the computer for purposes of evaluation. Based on the status data, it is possible for the computer to determine centrally whether there is a malfunction or risk of malfunction of the equipment object of the deployed person to be monitored, whether a current function status or operating status of the equipment object is being determined, or whether a current gas composition of a gas surrounding the deployed person and/or a physical state of the deployed person (for example, a state of movement, heart functionality, lung functionality, etc.) is/are being determined. The status data 2 which the mobile monitoring apparatus 12 transmits in accordance with the first wireless communication standard to the base station 11 is thus, for example, indicative of a status of the equipment object, of a status of the deployed person and/or of a current environmental situation of the deployed person.

The operating of the mobile monitoring apparatus 12 as a participant in the radio cell (F) provided by the base station 11 requires a prior registration process and if applicable a prior sign-on process, in which the mobile monitoring apparatus 12 is matriculated (registered) by the base station 11 as the participant in the radio cell (F) or in which the mobile monitoring apparatus 12 signs on as a participant in the radio cell (F). This process is also referred to as "pairing." For these purposes, the base station 11 comprises a wireless interface (IF) 111 and the mobile monitoring apparatus 12 comprises a signaling tag (ST) 121.

Whereas, by means of the radio cell (F) operated in accordance with the first wireless communication standard, a wireless network is established in which more than two mobile monitoring apparatuses can act as participants (clients), in accordance with the second wireless communication standard, a point-to-point connection is established for example only between the base station 11, on the one hand, and the mobile monitoring apparatus 12, on the other hand, and only when below the minimum distance (A).

The wireless interface 111 of the base station 11 automatically reads out participant information 3 from the mobile monitoring apparatus 12, in particular wirelessly via the signaling tag 121 in accordance with a second wireless communication standard, and only when the mobile monitoring apparatus 12 is within a minimum distance (A) from the base station 11, which is predetermined by the second wireless communication standard (as in the case of position $P_2$). Based on the participant information 3, the base station 11 registers the mobile monitoring apparatus 12 as a participant in the radio cell (F).

The second wireless communication standard differs from the first wireless communication standard.

The second wireless communication standard, for example, is a near field communication standard, for example, the near field communication (NFC) standard and/or the radio frequency identification (RFID) standard. Such standards require that the distance between the communication participants in question be within a minimum amount (minimum distance), which is, for example, several centimeters, such as 10 cm. The range of the radio cell (F) in any case is a multiple of the minimum distance (A). As mentioned, the range of the radio cell (F) can be more than 30 to 300 m, for example, whereas the minimum distance (A) is a few centimeters, for example.

If the mobile monitoring apparatus 12 is brought in the vicinity of the base station 11, for example, by the deployed person himself/herself, and if the mobile monitoring apparatus 12 in the process comes within the minimum distance (A) (position $P_2$), then the read out of the participant information 3 occurs automatically. In other words, the participant information 3 is transmitted wirelessly in accordance with the second wireless communication standard from the mobile monitoring apparatus 12 by means of the signaling tag 121 to the wireless interface 111 of the base station 11.

The signaling tag 121 can be configured as a passive or an active signaling tag, as desired, wherein a passive signaling tag has the advantage that it does not cause any energy consumption. The participant information 3 can be stored, for example, in the signaling tag 121 itself.

Based on the received participant information 3, the base station registers the mobile monitoring apparatus 12 as a participant in the radio cell (F). When the mobile monitoring apparatus 12 is already matriculated (registered) in the radio cell as a participant, then an exmatriculation (deregistration) of the mobile monitoring apparatus 12 is carried out by the base station 11.

When below the minimum distance (A), not only is it possible for a transmission of the participant information 3 from the monitoring apparatus 12 to the base station 11 to occur, but the mobile monitoring apparatus 12 can also automatically receive from the base station 11 base station information 4 provided by the wireless interface 111, by means of the signaling tag 121, wirelessly in accordance with the second wireless communication standard, and it can sign on based on the received base station information 4 as a participant in the radio cell. Depending on the configuration and/or the type of the first wireless communication standard, it can be necessary both for the mobile monitoring apparatus 12 to be matriculated (registered) as a participant by the base station 11, and also for it to sign on as a participant in the radio cell (F) based on the received base station information 4.

If the signaling tag 121 is an active signaling tag, then the mobile monitoring apparatus 12 can switch the signaling tag 121 into an energy saving mode and activate it only when the mobile monitoring apparatus 12 is within the minimum distance (A) from the base station 11 and/or when a certain input command is being entered or has already been entered—for example, by the deployed person—via an operating element (UI) 123 of the mobile monitoring apparatus 12.

Figure 2:
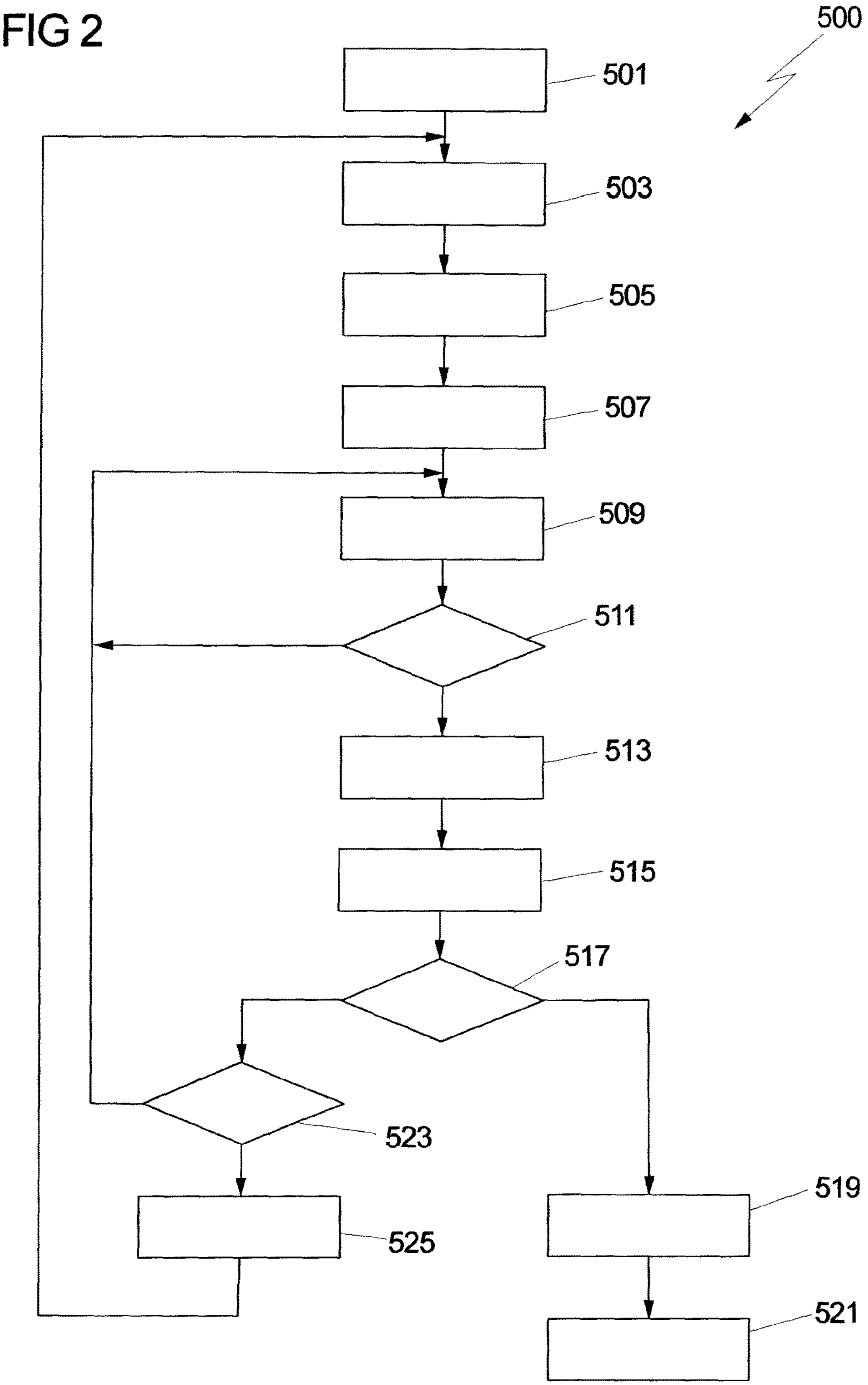
FIG. 2 is a diagrammatic representation example of a flow diagram to illustrate a communication between a base station and a mobile monitoring apparatus in accordance with a second wireless communication standard according to the principles of the present invention.

Below, in reference in FIG. 2, an example of a communication sequence 500 between the base station 11 and the mobile monitoring apparatus 12 is explained. For this example, it is assumed that the second wireless communication standard is the NFC standard (ISO/IEC 18092). The wireless interface 111 of the base station 11 is thus designed in order to operate in accordance with this NFC standard and the signaling tag 121 of the mobile monitoring apparatus 12 is also designed to operate in accordance with the NFC standard. Below, the individual steps 501 to 525 of the example of a communication sequence 500 are explained tabularly:

Step 501: The mobile monitoring apparatus 12 starts, in a certain operating mode, upon reception of a specific user input which has been entered via the operating element 123. At this point in time, the signaling tag 121 is in an energy saving mode, that is it is deactivated and it consumes little or no energy.

Step 503: The mobile monitoring apparatus 12 receives, via the operating element 123, an additional input command and it subsequently switches to a sign-on mode. Step 505: After this change in mode, the mobile monitoring apparatus 12 activates the signaling tag 121, that is, for example, an NFC module contained in the signaling tag 121. The signaling tag 121 is now operational.

Step 507: The mobile monitoring apparatus 12 moves within the minimum distance A. The signaling tag 121 acts in the subsequent communication as an initiator (so-called NFC initiator) of the communication, and the wireless interface 111 of the base station 11 acts as a communication participant (so-called NFC target).

Step 509: The mobile monitoring apparatus 12 attempts to set up a point-to-point connection with the wireless interface 111 in accordance with the second wireless communication standard, that is to say the NFC standard.

Step 511: The mobile monitoring apparatus 12 on its side carries out a query to determine whether the connection setup attempt was successful. If this is the case, the procedure is continued with step 513. Otherwise, the mobile monitoring apparatus 12 again attempts to set up said point-to-point connection with the wireless interface 111 (Step 509).

Step 513: The connection setup attempt was successful and the base station 11, by means of the wireless interface 111, reads out the participant information 3 from the signaling tag 121. This participant information 3 comprises, in the example represented in FIG. 2, a registration request as well as a serial number of the monitoring apparatus 12. Moreover, the participant information 3 can also contain further information, for example, data indicative of the equipment object to be monitored, a name of the deployed person, a registration number of the deployed person, frequency band information, channel information, etc. The content of the participant information 3 is predetermined in part also by the first wireless communication standard used, since, on the basis of the participant information, the monitoring apparatus 12 is to be registered as a participant in the radio cell F which is operated in accordance with the first wireless communication standard.

Step 515: Following the transmission of the participant information, the monitoring apparatus 12 waits for a transmission of base station information 4 through the wireless interface 111. Such base station information comprises, for example, a registration confirmation, an error message and/or a base station serial number.

Step 517: An evaluation of the received base station information 4 is carried out by the mobile monitoring apparatus 12. If the mobile monitoring apparatus 12 receives a registration confirmation, that is a message indicative of a successful registration of the mobile monitoring apparatus 12, then the procedure is continued with Step 519. If the mobile monitoring apparatus 12 receives an error message, then an evaluation of the error message occurs (Step 523).

Step 519: The mobile monitoring apparatus 12 has received a registration confirmation. Subsequently, it automatically terminates the point-to-point connection with the base station 11 and it switches the signaling tag 121, for example, in the form of the NFC module, back into the energy saving mode in which little or no energy is consumed. Moreover, the mobile monitoring apparatus 12 switches to a normal operating mode.

Step 521: Based on the received base station information, the mobile monitoring apparatus 12 signs on as a participant in the radio cell (F). Now the mobile monitoring apparatus 12 can act as a participant in the radio cell (F) and, in particular, it can transmit the status data 2 in accordance with the first wireless communication standard to the base station 11.

Step 523: The mobile monitoring apparatus 12 has received an error message. An evaluation of the error message is carried out. For example, if the error message states that the base station 11 does not wish to register further participants in the radio cell (F), then the mobile monitoring apparatus 12 continues with Step 525. Otherwise, the mobile monitoring apparatus 12 starts again with Step 509.

Step 525: The base station 11 has communicated to the mobile monitoring apparatus 12, by means of the base station information 4, that no further participants are being registered in the radio cell (F). Subsequently, the mobile monitoring apparatus 12 terminates the point-to-point connection and it switches the signaling tag 121 to the energy saving mode. Thereafter, the mobile monitoring apparatus 12 switches to another normal operating mode and it attempts, for example, at a later point, to start the registration procedure again, that is to say it begins again with Step 503.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

LIST OF REFERENCE NUMERALS

1 Monitoring system
11 Base station
111 Wireless interface
112 Antenna
12 Mobile monitoring apparatus
121 Signaling tag
122 Transceiver
123 Operating element
2 Status data
3 Participant information
4 Base station information
A Minimum distance
F Radio cell
$P_1$ First position
$P_2$ Second position
500 Example of a communication sequence between base station and mobile monitoring apparatus
501-525 Individual steps of the example of a communication sequence

What is claimed is:

1. A mobile monitoring system for monitoring a deployed person, the mobile monitoring system comprising:
  - a base station comprising:
    - at least one antenna which provides a radio cell, wherein the radio cell uses a first communication standard, and
    - a wireless interface which uses a second communication standard; and
  - at least one mobile monitoring apparatus comprising:
    - a transceiver configured for receiving monitoring data from at least one equipment object and sending the monitoring data to the base station via the radio cell, and
    - a signaling tag having participant information,
  - wherein the wireless interface of the base station is configured to automatically read out the participant information from the signaling tag of the at least one mobile monitoring apparatus using the second communication standard when the at least one mobile monitoring apparatus is within a minimum predetermined distance from the base station to automatically register the at least one mobile monitoring apparatus as at least one participant in the radio cell if the at least one mobile monitoring apparatus is not registered as the at least one participant and to deregister the at least one mobile monitoring apparatus if the at least one mobile monitoring apparatus is registered as the at least one participant.

2. The mobile monitoring system of claim 1, wherein the second communication standard comprises a short range wireless communication standard of a predetermined distance.

3. The mobile monitoring system of claim 2, wherein the predetermined distance is a maximum operating range of the second communication standard.

4. The mobile monitoring system of claim 1, wherein the second communication standard comprises a near field communication standard.

5. The mobile monitoring system of claim 4, wherein the at least one mobile monitoring apparatus deregisters as the participant in the radio cell using the second communication standard.

6. The mobile monitoring system of claim 1, wherein the signaling tag is a radio frequency identification tag.

7. The mobile monitoring system of claim 1, wherein the signaling tag is a passive signaling tag.

8. The mobile monitoring system of claim 7, wherein the passive signaling tag is activated by a signal provided by the base station.

9. A mobile monitoring apparatus, comprising:

a first communication element that communicates with a wireless interface of a base station using a short range communication standard; and a second communication element configured for receiving monitoring data from at least one equipment object and sending the monitoring data to the base station using another communication standard, wherein the first communication element comprises participant information that is configured to be automatically read out by the wireless interface of the base station using the short range communication standard when the at least one mobile monitoring apparatus is within a minimum predetermined distance from the base station to automatically register, using the another communication standard, the at least one mobile monitoring apparatus as at least one participant in a radio cell if the at least one mobile monitoring apparatus is not registered as the at least one participant and to deregister, using the another communication standard, the at least one mobile monitoring apparatus if the at least one mobile monitoring apparatus is registered as the at least one participant.

10. The mobile monitoring apparatus of claim 9, wherein the short range communication standard is a near field communication standard.

11. The mobile monitoring apparatus of claim 9, wherein the first communication element comprises a near field communication element.

12. The mobile monitoring apparatus of claim 9, wherein the first communication element is a radio frequency identification tag.

13. The mobile monitoring apparatus of claim 9, wherein the first communication element is passive.

14. A base station, comprising:

a first communication element that communicates with a signaling tag of at least one mobile monitoring apparatus using a short range communication standard; and a second communication element that receives monitoring data sent from the at least one mobile monitoring apparatus using another communication standard, wherein the first communication element is configured to automatically read out participant information from the signaling tag of the at least one mobile monitoring apparatus using the short range communication standard when the at least one mobile monitoring apparatus is within a minimum predetermined distance from the base station to automatically register the at least one mobile monitoring apparatus as at least one participant in a radio cell if the at least one mobile monitoring apparatus is not registered as the at least one participant and to deregister the at least one mobile monitoring apparatus if the at least one mobile monitoring apparatus is registered as the at least one participant.

15. The base station of claim of 14, wherein the short range communication standard is a near field communication standard.

16. The base station of claim of 14, wherein the first communication element is a near field communication element.

17. The base station of claim of 14, wherein the first communication element is a radio frequency identification tag.

18. The base station of claim 14, wherein the first communication element is active and induces a paired passive communication element of the at least one mobile monitoring apparatus.

19. A method for monitoring a deployed person, the method comprising:

automatically registering at least one mobile monitoring apparatus as at least one participant for participation in a radio cell with a base station using a first communication channel if the at least one mobile monitoring apparatus is not registered as the at least one participant;

the first communication channel being a short range wireless communication channel;

thereafter employing a second communication channel to communicate monitoring data between the at least one mobile monitoring apparatus and the base station;

the second communication channel being a longer range wireless communication channel, wherein, during registering, a wireless interface of the base station is configured to automatically read out participant information from a signaling tag of the at least one mobile monitoring apparatus using the first communication channel when the at least one mobile monitoring apparatus is within a minimum predetermined distance from the base station, and wherein a wireless interface of the base station is configured to deregister the at least one mobile monitoring apparatus if the at least one mobile monitoring apparatus is registered as the at least one participant.

* * * * *